(12) United States Patent
Paulsen (10) Patent No.: US 7,672,450 B2
(45) Date of Patent: Mar. 2, 2010

(54) NETWORK INTERFACE DEVICE ENCLOSURE

(75) Inventor: Mark Thomas Paulsen, Minneapolis, MN (US)

(73) Assignee: Calix Networks, Inc., Petaluma, CA (US)

( * ) Notice: Subject to any disclaimer, the term of this patent is extended or adjusted under 35 U.S.C. 154(b) by 1219 days.

(21) Appl. No.: 10/937,809

(22) Filed: Sep. 9, 2004

(65) Prior Publication Data
US 2006/0067522 A1  Mar. 30, 2006

(51) Int. Cl.
*H04M 1/738* (2006.01)
(52) U.S. Cl. .............. 379/413.04; 29/840; 361/690; 361/707; 379/413.03; 439/76.1
(58) Field of Classification Search ............ 379/413.02, 379/21, 399.01, 412, 418, 440, 413.03, 413.04; 248/156; 439/54, 76.1; 29/840; 361/690, 361/707
See application file for complete search history.

(56) References Cited

U.S. PATENT DOCUMENTS

| | | | |
|---|---|---|---|
| 4,133,021 A | 1/1979 | King et al. | |
| 4,491,983 A | 1/1985 | Pinnow et al. | |
| 4,709,418 A | 11/1987 | Fox et al. | |
| 4,800,588 A | 1/1989 | Poster et al. | |
| 4,891,694 A | 1/1990 | Way | |
| 4,945,559 A | 7/1990 | Collins et al. | |
| 4,949,376 A | 8/1990 | Nieves et al. | |
| 5,121,244 A | 6/1992 | Takasaki | |
| 5,130,893 A | 7/1992 | Straate et al. | |
| 5,153,910 A | 10/1992 | Mickelson et al. | |
| 5,175,639 A | 12/1992 | Takasaki | |
| 5,303,229 A | 4/1994 | Withers et al. | |
| 5,325,223 A | 6/1994 | Bears | |
| 5,337,400 A | 8/1994 | Morin et al. | |
| 5,349,457 A | 9/1994 | Bears | |
| 5,355,401 A | 10/1994 | Skinner | |
| 5,359,654 A | 10/1994 | Jensen et al. | |
| 5,367,569 A * | 11/1994 | Roach et al. ................ | 379/412 |
| 5,394,466 A | 2/1995 | Schneider et al. | |
| 5,416,837 A | 5/1995 | Cote et al. | |

(Continued)

FOREIGN PATENT DOCUMENTS

JP       62-149229       7/1987

(Continued)

OTHER PUBLICATIONS

"Motorola ONT1000", Quantum Bridge Communications, (1pg.), www.quantumbridge.com.

(Continued)

*Primary Examiner*—Gerald Gauthier
(74) *Attorney, Agent, or Firm*—Shumaker & Sieffert, P.A.

(57) ABSTRACT

The disclosure describes an active network interface device (NID) enclosure having a modular construction that provides flexibility to a vendor and permits independent access to technician-accessible connections and subscriber-accessible connections while promoting resistance to environmental and security threats. The active NID enclosure includes an electronics enclosure and an access enclosure. The electronics enclosure contains active electronic components for conversion of data carried on a network signal carrier into services for delivery to subscriber devices. The access enclosure includes two separate access compartments, having separate covers, for independent access to either network terminals or subscriber terminals.

54 Claims, 6 Drawing Sheets

U.S. PATENT DOCUMENTS

| | | | | |
|---|---|---|---|---|
| 5,419,716 | A | | 5/1995 | Sciammarella et al. |
| 5,420,920 | A | * | 5/1995 | Capper et al. .......... 379/413.04 |
| 5,467,384 | A | | 11/1995 | Skinner |
| 5,479,505 | A | | 12/1995 | Butler et al. |
| 5,515,435 | A | * | 5/1996 | DeBalko et al. ........ 379/413.03 |
| 5,528,684 | A | * | 6/1996 | Schneider et al. ...... 379/413.03 |
| 5,570,422 | A | * | 10/1996 | Napiorkowski et al. 379/413.02 |
| 5,572,348 | A | | 11/1996 | Carlson et al. |
| 5,600,716 | A | * | 2/1997 | Broome et al. ......... 379/413.04 |
| 5,610,748 | A | | 3/1997 | Sakanaka et al. |
| 5,623,542 | A | * | 4/1997 | Schneider et al. ...... 379/413.03 |
| 5,633,926 | A | * | 5/1997 | Cannetti ..................... 379/440 |
| 5,719,934 | A | | 2/1998 | Tuvy |
| 5,754,643 | A | | 5/1998 | Decker et al. |
| 5,815,295 | A | | 9/1998 | Darcie et al. |
| 5,832,078 | A | * | 11/1998 | Tuvy et al. ............. 379/413.04 |
| 5,888,085 | A | | 3/1999 | Meyerhoefer et al. |
| 5,901,220 | A | * | 5/1999 | Garver et al. .......... 379/399.01 |
| 6,011,831 | A | * | 1/2000 | Nieves et al. .................. 379/21 |
| 6,039,578 | A | * | 3/2000 | Suffi et al. ..................... 439/54 |
| RE37,125 | E | | 4/2001 | Carlson et al. |
| 6,320,878 | B1 | | 11/2001 | Krimmel et al. |
| 6,433,672 | B1 | | 8/2002 | Shirmard |
| 6,683,950 | B1 | | 1/2004 | Harwood et al. |
| 6,714,647 | B1 | * | 3/2004 | Cowan et al. .......... 379/413.02 |
| 6,790,049 | B2 | * | 9/2004 | Kaylie et al. ............... 439/76.1 |
| 6,944,022 | B1 | * | 9/2005 | Kehret et al. ................ 361/690 |
| 7,031,465 | B1 | * | 4/2006 | Dibble et al. ............... 379/418 |
| 7,190,589 | B2 | * | 3/2007 | Caines et al. ................ 361/707 |
| 7,506,436 | B2 | * | 3/2009 | Bachman ..................... 29/840 |
| 2002/0031224 | A1 | * | 3/2002 | Basawapatna et al. ...... 380/211 |
| 2003/0002660 | A1 | * | 1/2003 | Albanese et al. ........ 379/413.02 |
| 2004/0149868 | A1 | * | 8/2004 | Schultz ....................... 248/156 |
| 2004/0264687 | A1 | * | 12/2004 | Casey et al. ............ 379/413.02 |
| 2005/0180560 | A1 | * | 8/2005 | Kortum et al. ......... 379/413.03 |
| 2006/0023846 | A1 | * | 2/2006 | Brower et al. .................. 379/33 |

FOREIGN PATENT DOCUMENTS

| | | |
|---|---|---|
| JP | 05-110620 | 4/1993 |
| WO | WO93/09612 | 5/1993 |
| WO | WO93/12624 | 6/1993 |
| WO | WO93/18605 | 9/1993 |
| WO | WO94/28665 | 12/1994 |
| WO | WO96/25824 | 8/1996 |

OTHER PUBLICATIONS

"Small Business Optical Network Terminator", Vinci Systems, Inc., 2004, (4 pgs.), www.vincisystems.com.

"Residential Optical Network Terminator", Vinci Systems, Inc., 2004, (4 pgs.), www.vincisystems.com.

Notification of Transmittal of the International Preliminary Report on Patentability for corresponding patent application No. PCT/US2005/032230, mailed Nov. 13, 2006, (10 pages).

Notification of Transmittal of the International Search Report and the Written Opinion for patent application No. PCT/US2005/032230, mailed Jan. 24, 2006, (12 pages).

* cited by examiner

FIG. 1

LEGEND
10 – NID
12 – ELECTRONICS ENCLOSURE
14 – ACCESS ENCLOSURE
16 – SERVICE COMPARTMENT
18 – FIRST COVER
20 – SUBSCRIBER COMPARTMENT
22 – SECOND COVER
24 – MOUNTING FRAME 26 and 28 – CONDUITS
30 – SECURITY LATCH
32B and 34 – MOUNTING BRACKETS
35 – SLOT
36A, 36B and 38 – MOUNTING HOLES
40 – FLANGE

FIG. 2

LEGEND
10 – NID
12 – ELECTRONICS ENCLOSURE
14 – ACCESS ENCLOSURE
18 – FIRST COVER
24 – MOUNTING FRAME
26 and 28 – CONDUITS
32A, 32B and 34 – MOUNTING BRACKETS
35 – SLOT
40 – FLANGE

FIG. 3

LEGEND
10 – NID
14 – ACCESS ENCLOSURE
16 – SERVICE COMPARTMENT
20 – SUBSCRIBER COMPARTMENT
24 – MOUNTING FRAME
32A, 32B and 34 – MOUNTING BRACKETS
42 and 48 – OPENINGS
44, 46, 50 and 52 – AUXILIARY OPENINGS

FIG. 4

LEGEND
10 – NID
14 – ACCESS ENCLOSURE
16 – SERVICE COMPARTMENT
18 – FIRST COVER
20 – SUBSCRIBER COMPARTMENT
22 – SECOND COVER
24 – MOUNTING FRAME
26 and 28 – CONDUITS 32B and 34 – MOUNTING BRACKETS
38 – MOUNTING HOLE
42 and 48 – OPENINGS
44, 46, 50 and 52 – AUXILIARY OPENINGS
54 – TEMPORARY COVER
55 – WALL
57 – OPTIONAL COMPARTMENT

LEGEND
12 - ELECTRONICS ENCLOSURE
36A and 36B - HOLES
40- FLANGE
74 – CIRCUIT CARD
76 – POWER INPUT
78 – OPTICAL FIBER TERMINAL
80, 82, 84 and 86 – SUBSCRIBER TERMINALS
87 – FACE PLATE

NETWORK INTERFACE DEVICE ENCLOSURE

TECHNICAL FIELD

The invention relates to network interface devices (NIDs) designed to deliver integrated network services to subscriber premises and, more particularly, enclosures for housing and securing NID components

BACKGROUND

Integrated networks transmit voice, video and data to subscribers via network signal carriers in the form of coaxial cable or optical fiber. An example of an integrated network is a passive optical network (PON), which can deliver voice, video and other data among multiple network nodes, often referred to as optical network terminations (ONTs), using a common optical fiber link. Passive optical splitters and combiners enable multiple ONTs to share the same optical fiber link. An optical line terminations (OLT) transmits information downstream to the ONTs, and receives information transmitted upstream from the ONTs. Each ONT terminates the optical fiber link for a residential or business subscriber, and is sometimes referred to as a subscriber premises node.

An ONT in a PON functions as an active network interface device (NID). An active NID converts information received on a network signal carrier into services suitable for use by various subscriber devices, such as telephone, video and data services. For example, an active NID in a PON converts optical signals received from the network on an optical fiber to electrical signals for transmission to a subscriber device. In addition, the active NID converts information received from the subscriber devices into integrated data for transmission over a network signal carrier, such as an optical fiber.

Some active NIDs have an enclosure with three different covers that serve to protect electronic circuitry and network terminals from environmental conditions and security threats. For example, the electronic circuitry in a NID is typically fabricated on a circuit card and enclosed in a first, inner protective cover to reduce electromagnetic interference (EMI) emissions and susceptibility to EMI. Shielding the circuit card from EMI improves the reliability of the electronic circuitry to convert the data into useful services for the subscriber.

A second, intermediate protective cover encloses both the circuit card and the first protective cover, as well as the connections to the integrated network, and is accessible only by a service technician via a security latch. In this manner, the NID and its protective cover create a demarcation point between integrated network terminals accessible only by the service technician, and subscriber network terminals accessible by the subscriber. The intermediate cover typically encloses network terminals which require training to handle, such as power inputs, safety ground, and the main signal input, which may be carried by coaxial cable, or fiber optic cable, so as to provide safety measures and prevent tampering by the subscriber or others.

The intermediate cover does not cover the subscriber connections. Instead, the subscriber is permitted to access subscriber terminals such as binding posts or jacks for plain old telephone service (POTS) wires, coaxial cables, and data connections in order to disconnect wiring leading into the subscriber's premise and test the outside line directly. For example, the subscriber can test outside phone lines by plugging a modular phone directly into a POTS connection, such as an RJ-11 phone jack in order to determine if there is a problem with the subscriber's wiring inside the subscriber premises or with the network. The subscriber also may have access to lightning protection for telephony, cable television, Ethernet and safety grounding. A third, outer cover encloses the circuit card, the inner cover, the intermediate cover, the network terminals, and the subscriber terminals, providing the NID with protection from moisture, debris, solar loading, animals and other adverse environmental conditions.

SUMMARY

In general, the invention is directed to an active NID enclosure having an electronics enclosure and an access enclosure that interfaces with the electronics enclosure. The access enclosure permits independent access to technician-accessible connections and subscriber-accessible connections while promoting resistance to environmental and security threats. The active NID enclosure may be especially useful in forming an ONT in a PON.

In accordance with the invention, the active NID enclosure is constructed to accommodate modular electronics enclosures. In some cases, the active NID enclosure may accommodate electronics enclosures of different sizes. The electronics enclosure has an opening that mates with an opening in the access enclosure. In some embodiments, the openings may be formed in a bottom surface of the electronics enclosure and a top surface of the access enclosure. In this manner, the electronics enclosure may be stacked vertically on top of the access enclosure, permitting selection of electronics enclosures having different heights.

Figure 1:
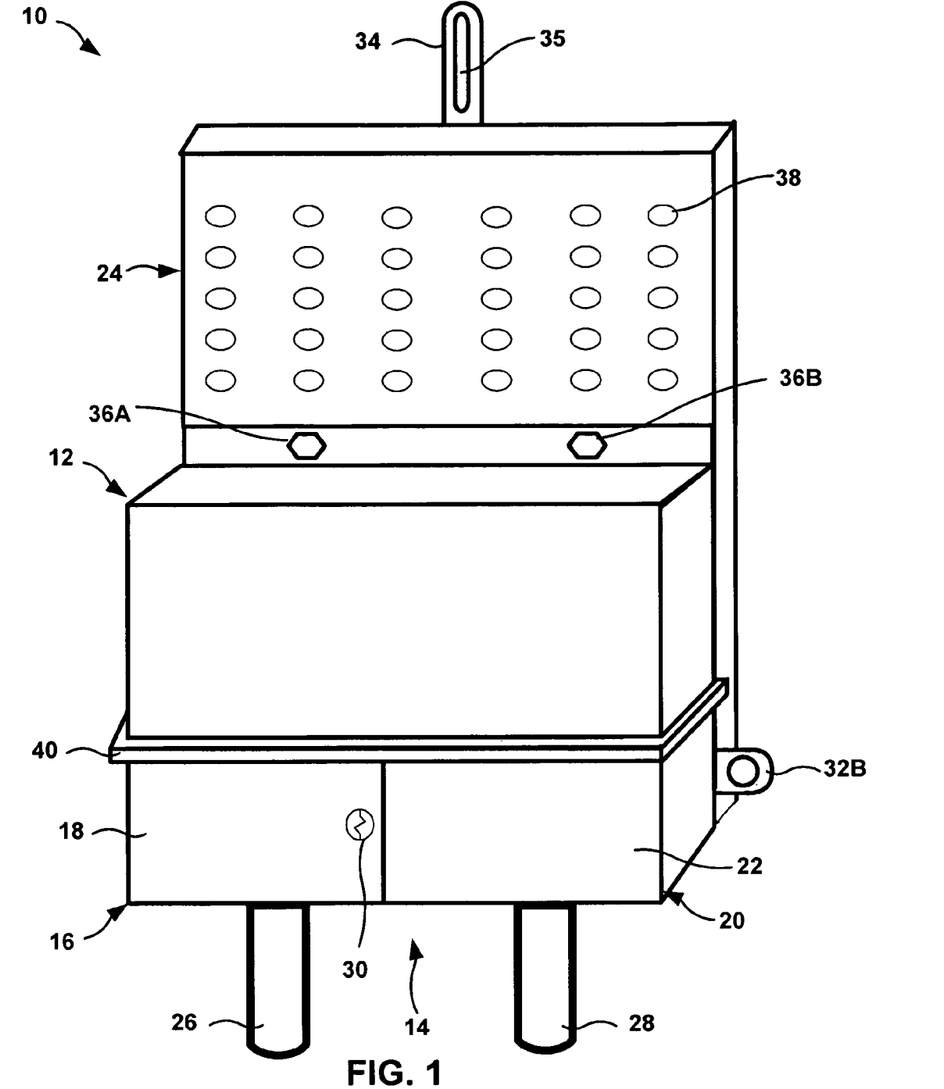
FIG. 1 is a front perspective view illustrating an example active NID that includes an electronics enclosure and an access enclosure that interfaces with the electronics enclosure according to an embodiment of the invention.

The structure of mounting frame 24 may be particularly advantageous when mounting to a brick surface. The size of bricks and the thickness of grout separating bricks is typically not uniform, and therefore, fixed mourning points are generally undesirable for these and similar surfaces. Accordingly, vertical slotted mounting bracket 34 allows a fastener to be inserted at any point along slot 35 so as to fasten active NID 10 to the subscriber premises more easily. In this manner, the position of the fastener may be adjusted so that it may be inserted into the grout of the subscriber premises rather than the brick, which can be more difficult. Similar slotted arrangements can be provided for mounting brackets 32A (not shown), 32B. The structure of mounting brackets 32, 34 is merely exemplary and should not be considered limiting.

The electronics enclosure contains active electronic circuitry that converts network data into services for delivery to subscriber devices. The access enclosure may include two separate access compartments, having separate covers, for independent access to either network terminals or subscriber terminals. The electronics enclosure provides environmental and security protection of the active electronic circuitry, while the access enclosure provides selective access to technician-accessible connections and subscriber-accessible connections.

In one embodiment, the invention provides an active network interface device comprising an access enclosure comprising a service compartment, a subscriber compartment, and an opening to the service compartment and the subscriber compartment, and an electronics enclosure comprising a network terminal, a subscriber terminal, and active electronic circuitry to convert information received at the network terminal for delivery to a subscriber device via the subscriber terminal, wherein the electronics enclosure is mounted to the opening in the access enclosure such that the network terminal is accessible via the service compartment and the subscriber terminal is accessible via the subscriber compartment.

In another embodiment, the invention provides a method comprising mounting an access enclosure to a surface of a subscriber premises, the access enclosure comprising a service compartment, a subscriber compartment, and an opening to the service compartment and the subscriber compartment, and mounting an electronics enclosure to the opening in the access enclosure, the electronics enclosure comprising a network terminal, a subscriber terminal, and active electronic circuitry to convert information received at the network terminal for delivery to a subscriber device via the subscriber terminal, wherein the electronics enclosure is mounted to the opening in the access enclosure such that the network terminal is accessible via the service compartment and the subscriber terminal is accessible via the subscriber compartment.

In a further embodiment, the invention provides an access enclosure for an active network interface device, the access enclosure comprising a service compartment including a first opening to permit ingress of a network signal carrier from an integrated services network, and a subscriber compartment positioned side-by-side with the service compartment and including a second opening to permit egress of a subscriber signal carrier into a subscriber premises, wherein each of the service compartment and the subscriber compartment includes a top surface defining an opening to receive an electronics enclosure such that a network terminal carried by the electronics enclosure is accessible via the service compartment and a subscriber terminal carried by the electronics enclosure is accessible via the subscriber compartment.

In an additional embodiment, the invention provides an electronics enclosure for an active network interface device, the electronics enclosure comprising a housing, a network terminal, mounted within the housing, for connection to a network signal carrier carrying information from an integrated services network, a subscriber terminal, mounted within the housing, for connection to a subscriber signal carrier to deliver information to a subscriber device within a subscriber premises, and active electronic circuitry, mounted within the housing, to convert the information received at the network terminal to the information for delivery to a subscriber device via the subscriber terminal, wherein the housing is shaped substantially as a rectangular prism and is substantially closed on five sides and at least partially open on a sixth, bottom surface to permit access to the network terminal and the subscriber terminal.

The invention may offer one or more advantages. As an example, the electronics enclosure can be constructed in a modular fashion independently of the access enclosure. The electronics enclosure is not mounted within the access enclosure, but rather to the access enclosure. In this manner, the circuitry within the electronics enclosure can be designed to a particular vendor's specifications, which may result in variations in size due to varying complexity, as well as to accommodate different vendor's EMI and shielding requirements. Consequently, the electronics enclosure can be customized according to individual vendors' requirements and installed on a selective basis into a generic interface provided by the access enclosure. In addition, the use of an independent electronics enclosure may provide thermal dissipation advantages, either by increased ventilation, reduced insulation or increased heat sinking of heat generated by the electronic circuitry by the electronics enclosure.

In some embodiments, the invention may provide improved flexibility for mounting and replacing electronics enclosures of varying size, and improved efficiency in mounting the access enclosure to the subscriber premises. For example, for embodiments in which the electronics enclosure is vertically mounted on top of the access enclosure, the access enclosure may accommodate electronics enclosures of different heights without the need for additional hardware or mounting holes.

The details of one or more embodiments of the invention are set forth in the accompanying drawings and the description below. Other features, objects, and advantages of the invention will be apparent from the description and drawings, and from the claims.

DETAILED DESCRIPTION

Figure 2:
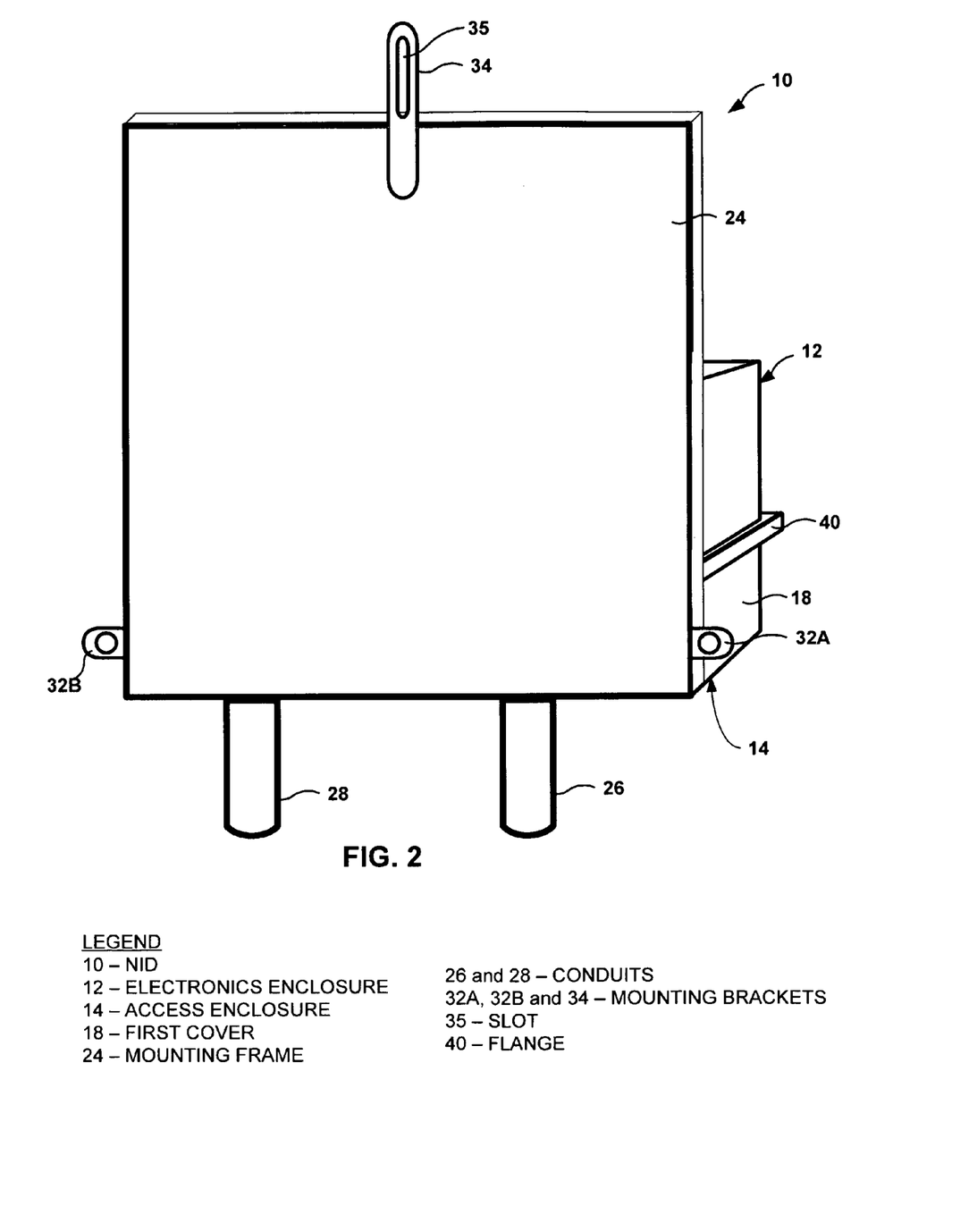
FIG. 2 is a rear perspective view of the active NID of FIG. 1.

FIG. 1 is a front view illustrating an example active NID 10 suitable for use in an integrated services network, such as a PON, which carries voice, video and/or data. FIG. 2 is a rear view of the active NID of FIG. 1. As shown in FIGS. 1 and 2, NID 10 includes an electronics enclosure 12 and an access enclosure 14 that interfaces with the electronics enclosure according to the invention. Electronics enclosure 12 can be constructed in a modular fashion independently of access enclosure 14, customized according to individual vendors' requirements, and installed on a selective basis into access enclosure 14. In this manner, NID 10 can be constructed to accommodate differently sized electronic enclosures 12, providing flexibility in the installed configuration of the NID at the subscriber premises. Additionally, electronics enclosure 12 and access enclosure 14 provide security and protection from environmental conditions for network and subscriber terminals.

As a further advantage, an electronics enclosure 12 fabricated independently from access enclosure 14 may provide thermal dissipation advantages, either by increased ventilation or increased heat sinking of heat generated by the electronic circuitry by the electronics enclosure. For example, electronics enclosure 12 may be exposed to the local environment, rather than encased within a larger enclosure. In addition, in some embodiments, electronics enclosures 12 may have a larger volume or size for enhanced heat dissipation through ventilation, reduced insulation or heat sinking. In particular, with an external electronics enclosure 12, there are less layers of insulation, such as plastic, to contribute to undesirable heating.

Access enclosure 14 includes a service compartment 16 having a first cover 18, a subscriber compartment 20 having a second cover 22, and a mounting frame 24 to mount electronics enclosure 12 relative to the service compartment and the subscriber compartment. Electronics enclosure 12 includes one or more network terminals, active electronic circuitry to convert information received from the network terminals, and one or more subscriber terminals to transmit the converted information to a subscriber device within a subscriber premises. In turn, the active electronic circuitry may be equipped to convert information received from subscriber devices into integrated data for transmission via the integrated services network. The electronic circuitry in electronics enclosure 12 may be substantially similar to conventional circuitry used in ONTs in existing PON architectures, as is well understood by those skilled in the art, and need not be described herein.

A network terminal resides within electronic enclosure 12. The network terminal (not shown in FIGS. 1 and 2) terminates a physical network signal carrier from an integrated services network. In addition, electronics enclosure 12 includes a subscriber terminal (not shown in FIGS. 1 and 2) connected to one or more physical subscriber signal carriers that extend into the subscriber premises for connection to one or more subscriber devices.

The network terminal may receive, for example, an optical fiber or coaxial cable carrying voice, video and data. Active electronic circuitry within electronics enclosure 12 converts the voice, video and data into services for use by device within the subscriber premises, such as telephone, analog or digital cable television, and Internet services. The subscriber terminal may include separate terminals for telephone, video and Internet services. In addition, the electronic circuitry may transform telephone and Internet data received from subscriber devices for transmission over the integrated services network.

Electronics enclosure 12 may be shaped substantially as a rectangular prism that is substantially closed on five sides and at least partially open on a sixth, lower side, to permit access to the network terminals and the subscriber terminals via service compartment 16 and subscriber compartment 20, respectively. The substantially closed sides of electronics enclosure 12 may accommodate some openings, but the major opening is formed in the bottom surface of the electronics enclosure to mate with access enclosure 14. Electronics enclosure 12 serves to shield one or more circuit cards from electromagnetic interference (EMI) and suppress EMI emissions by circuitry on the circuit cards. In addition, electronics enclosure 12 provides protection from environmental conditions.

Electronics enclosure 12 can be constructed in a modular fashion independently of access enclosure 14, and may have different sizes. For example, if electronics enclosure 12 is vertically mounted on top of access enclosure 14, i.e., in a vertically stacked configuration, the electronics enclosure may have different heights without disrupting the interface between the electronic enclosure and the access enclosure. In this manner, active electronic circuitry within electronics enclosure 12 can be designed to a particular vendors' specifications, which may result in variations in size due to varying complexity, size and number of components, as well as accommodate different vendors' EMI and shielding requirements.

For example, some vendors may want to include a lifeline battery and battery charger, which may require the active electronics to have an increased size relative to an electronics enclosure without such components. Typically, a vendor would be required to install an access enclosure that is large enough to fit the entire electronics enclosure 12 within access enclosure 14. In accordance with the invention, however, electronics enclosure 12 may have different heights that extend upward away from access enclosure 14, either to the height of mounting frame 24, or exceeding the height of the mounting frame.

Also, in some embodiments, electronics enclosure 12 may serve as a housing for an external battery to power the electronic circuitry in the event of a power failure. The battery may be added to the back, top, or front of electronics enclosure 12, either on mounted on the outer surface of the electronics enclosure, or mounted within the electronics enclosure. In this case, electronic circuitry may include appropriate power conversion circuitry to convert batter power to operating power. In some cases, the battery may be mounted proximate to the electronic circuitry such that the circuitry generates heat that keeps the battery relatively warm for better operation. In addition, electronics enclosure 12 may be manufactured in different sizes designed to accommodate differently sized batteries.

Access enclosure 14 includes service compartment 16 and subscriber compartment 20 positioned side-by-side in the example of FIG. 1, although the invention is not necessarily limited in that respect. Access enclosure 14 includes an opening to interface with the opening formed in electronics enclosure 12. For example, service compartment 16 and subscriber compartment 20 each include a top surface that is at least partially open to permit access to the network terminals and subscriber terminals via the lower surface of electronics enclosure 12 upon mounting of electronics enclosure 12 over access enclosure 14. In addition, a bottom surface of service compartment 16 is at least partially open to permit ingress of a conduit 26 containing a network signal carrier, such as an optical fiber, coaxial cable, or telephone line.

Similarly, a bottom surface of subscriber compartment 20 is at least partially open to permit egress of a conduit 28 containing one or more subscriber signal carriers, such as telephone wiring, coaxial cable and data wiring. Hence, the subscriber terminal in electronics enclosure 12 may include a telephone terminal, a video terminal and a data terminal. Covers 18 and 22 may take the form of doors that swing or slide open to permit access to service compartment 16 and subscriber compartment 20, respectively. Service compartment cover 18 may include a security latch 30 to lock service compartment 16 against unauthorized entry. Security latch 30 may take a variety of forms, including a keyed barrel lock or padlocked bracket.

Mounting frame 24 may comprise a mounting plane, and may include a pair of mounting brackets 32A (not shown), 32B to accommodate respective screws for mounting to a surface at the subscriber premises, such as an interior or exterior wall. The wall may be an exterior wall constructed, for example, with brick masonry, stucco, wood or synthetic materials. As shown in FIG. 1, mounting frame 24 may include surplus vertical space to accommodate electronic enclosures 12 of different heights. Ideally, the vertical height of mounting frame 24 should not substantially exceed the vertical height of the top of electronics enclosure 12 upon mounting on access enclosure 14. As mentioned above, however, some excess height in mounting frame 24 may be desirable to accommodate electronics enclosures 12 of different heights. A vertical slotted mounting bracket 34 extends from an upper surface of mounting frame 24 and permits selective placement of a screw at different vertical positions to mount the electronic enclosure to a wall of the subscriber premises.

The structure of mounting frame 24 may be particularly advantageous when mounting to a brick surface. The size of bricks and the thickness of grout separating bricks is typically not uniform, and therefore, fixed mounting points are generally undesirable for these and similar surfaces. Accordingly, vertical slotted mounting bracket 34 allows a fastener to be inserted at any point along slot 35 so as to fasten active NID 10 to the subscribers premises more easily. In this manner, the position of the fastener may be adjusted so that it may be inserted into the grout of the subscriber premises rather than the brick, which can be more difficult. Similar slotted arrangements can be provided for mounting brackets 32A (not shown), 32B. The structure of mounting brackets 32, 34 is merely exemplary and should not be considered limiting.

Electronics enclosure 12 is mounted to mounting frame 24 via a pair of mounting holes 36A, 36B. Screws, bolts or other fasteners extend through mounting holes 36A, 36B to mount to selected mounting holes 38 in an array of mounting holes formed in mounting frame 24. In an alternative embodiment, mounting frame 24 and electronics enclosure 12 may be constructed so that the electronics enclosure simply snaps into the mounting frame. A bottom surface of electronics enclosure 12 rests on an upper surface of access enclosure 14. Electronics enclosure 12 includes an outer flange 40 that extends over a perimeter of the top surface of service compartment 16 and subscriber compartment 20. Service compartment 16 and subscriber compartment 20 may define a ridge to receive outer flange 40. Flange 40 may prevent inflow of rain or other moisture downward into access enclosure 14. In some embodiments, flange 40 may be fitted with a gasket or other seal member to form a tight seal over the top surface of access enclosure 14. Access enclosure 14 may be welded or otherwise fastened to mounting frame 24. In other embodiments, mounting frame 24 and access enclosure 14 may be integrally formed as a single component, e.g., by molding.

Access enclosure 14 is constructed to allow limited access to network and subscriber terminals. Service compartment 16 is accessible only by a service technician, in order to prevent tampering or service attempts by the subscriber or other unauthorized individuals. Conduit 26 may include power, safety ground, and the main signal input from an integrated services network, which may be carried by coaxial cable, telephone line, or optical fiber. Subscriber compartment 20 receives wiring from the subscriber network such as plain old telephone service (POTS), video, and Ethernet via conduit 28 is accessible by the subscriber.

Hence, with subscriber compartment 20, the subscriber has access to POTS wires and data connections in order to disconnect all wiring inside the subscriber premises and test the outside line directly. For example, the subscriber can test outside phone lines directly by plugging in a modular phone so that the telephone company can determine whether there is a problem with the subscriber's wiring inside the premises or with the integrated services network. Subscriber compartment 20 also may allow access to lightning protection for telephony, cable television, Ethernet, and safety grounding.

Electronics enclosure 12, service compartment 16, and subscriber compartment 20 additionally provide protection from adverse effects such as solar loading, moisture, debris, animals, and other adverse effects. The enclosure structure of active NID 10 may be fabricated, partially or entirely, from a moldable plastic or any material that provides similar protection. This approach may make use of a simple mold that does not require movement. In some embodiments, active NID 10 may be constructed substantially of metal, with covers 18 and 22 being constructed from molded plastic. In either case, the side-by-side construction of service compartment 16 and subscriber compartment 20, and the incorporation of independent covers 18, 22, results in significant reduction in the amount of materials required for fabrication. Cost savings are especially significant in the case of molded plastic, which can be expensive. In particular, covers 18, 22 are mounted side-by-side, rather than in an overlapping arrangement.

As shown in FIGS. 1 and 2, in order to mount active NID 10 to a subscriber premises, fasteners are inserted through mounting brackets 32A, 32B, 34 in mounting frame 24. In turn, electronics enclosure 12 is mounted to mounting frame 24, rather than to the wall of the subscriber premises. This approach eliminates the need to drill new holes into the subscriber's premise when replacing or upgrading a circuit card, battery, battery charger, or other such hardware contained in an electronics enclosure. In particular, if a replacement electronic enclosure 12 has different size than an original electronics enclosure, the replacement electronics enclosure is simply mounted to mounting frame 24, rather than the subscriber premises wall.

Figure 3:
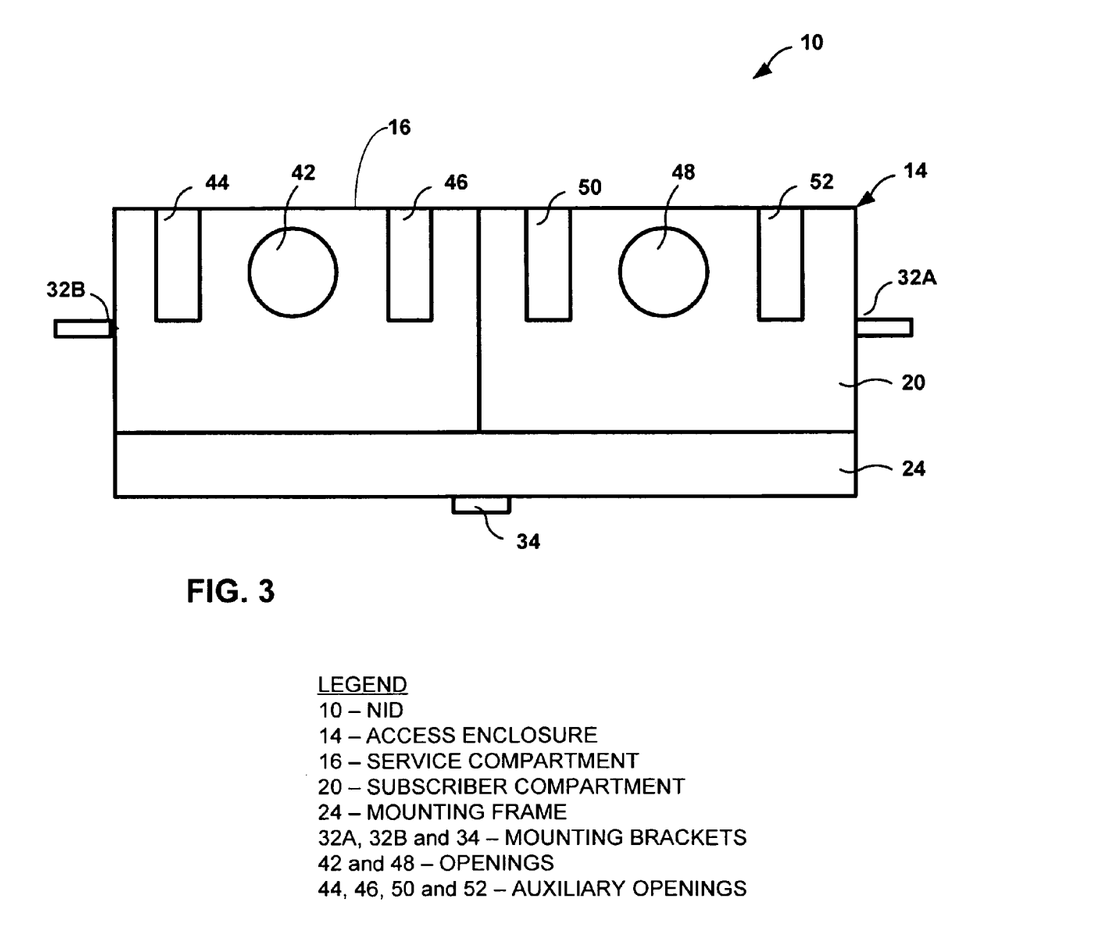
FIG. 3 is a bottom view of the active NID of FIGS. 1 and 2.

FIG. 3 is a bottom view of active NID 10 of FIGS. 1 and 2. In particular, FIG. 3 illustrates a bottom surface of access enclosure 14, including service compartment 16 and subscriber compartment 20. Service compartment 16 includes a bottom opening 42 to permit ingress of an integrated network signal carrier via conduit 26 (FIG. 1), as well as one or more auxiliary openings 44, 46. Integrated network signal carriers may include optical fiber, coaxial cable, or digital subscriber line (DSL) over copper telephone lines. The integrated network signal carriers enter service compartment 16 via opening 42. Power and ground wiring may also enter service compartment 16 via one or both of openings 44, 46.

Subscriber compartment 20 includes an opening 48 to permit egress of one or more subscriber network signal carriers via conduit 28 (FIG. 1), as well as one or more auxiliary openings 50, 52 for other optional signal carriers. Subscriber network signal carriers may include POTS wiring, coaxial video cable, Ethernet cable, or the like. Openings 50, 52 in subscriber compartment 20 may be used for additional wiring purposes such as running additional wire from inside the subscriber premises into active NID 10.

In some embodiments, openings 42, 48, 44, 46, 50, 52 are pre-fabricated in access enclosure 14. Alternatively, openings 42, 48 44, 46, 50, 52 may be exposed by a service technician at the subscriber premises using cutting tools or by prefabricated punch-outs. Openings 42, 48, 44, 46, 50, 52 may include suitable gaskets or grommets to allow signal carriers to enter access enclosure 14 without exposing the wiring and connection terminals inside the access enclosure to moisture, debris, animals, or other adverse effects. The arrangement of openings 42-52 in FIG. 3 is merely illustrative and should not be taken as limiting as to the number and shape of openings formed in access enclosure 14.

Figure 4:
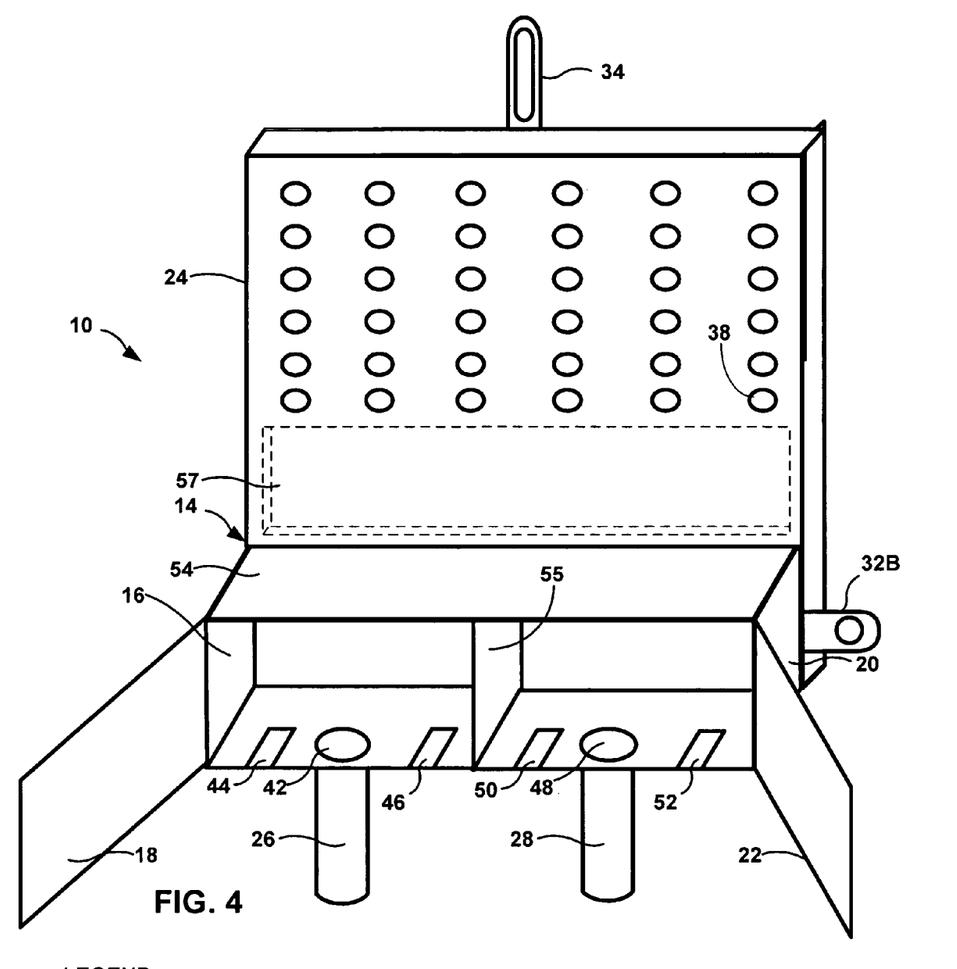
FIG. 4 is a front perspective view of an active NID prior to installation of the electronics enclosure.

FIG. 4 is a front perspective view of active NID 10 prior to installation of electronics enclosure 12. Often, mounting frame 24 may be installed by an installer before a technician arrives to make appropriate network terminals and install electronics enclosure 12. The time between initial installation of mounting frame 24 and arrival of the technician may amount to several hours or days. For this reason, access enclosure 14 may be equipped with a temporary cover 54, which mounts over a top surface of access enclosure 14 to protect network terminals within service compartment 16 and subscriber compartment 20 until the technician installs electronics enclosure 12.

Temporary cover 54 may be fitted tightly to access enclosure 14 to provide protection from environmental conditions. For example, temporary cover 54 may include a ridge that mounts closely inside the inner walls of access enclosure 14. Alternatively, temporary cover 54 may be adhesively mounted or bounded to access enclosure 14, e.g., with cable ties. In some embodiments, temporary cover 54 may include a security latch to prevent unauthorized access to service compartment 16 and subscriber compartment 20. When electronics enclosure 12 is mounted by a technician, temporary cover 54 may be removed and either reused, discarded or recycled.

As further shown in FIG. 4, cover 18 allows a service technician to access network terminals within service compartment 16. Cover 18 permits access to subscriber network terminals within subscriber compartment 20. In the example of FIG. 4, covers 18, 22 take the form of doors that swing outward, e.g., on a hinge. In other embodiments, covers 18, 22 may be slidable or otherwise movable to permit access to service compartment 16 and subscriber compartment 20. Importantly, covers 18, 22 may be independently opened to permit access by either a technician or a subscriber, respectively. In this sense, service compartment 16 and subscriber compartment 20 define demarcation points between the respective connections accessible by the technician and subscriber. Notably, a wall 55 separates service compartment 16 and subscriber compartment 20.

FIG. 4 also depicts an optional compartment 57 formed as a recessed area within mounting frame 24. Compartment 57 may serve a variety of purposes such as storage of components. For example, compartment 57 may serve as a splice tray to hold optical fiber or electrical cable along with connectors for coupling the fiber or cable to connectors or terminals within electronics enclosure 12 or access enclosure 14. Compartment 57 may have a depth on the order of approximately one to three inches to accommodate a sufficient amount of fiber or cable. The depth, as well as the height and width, of compartment 57 may be varied.

Access enclosure 14, including service compartment 16 and subscriber compartment 20, is attached to mounting frame 24. Service compartment 16 and subscriber compartment 20 can be made to a standard size for most subscribers. In some embodiments, service compartment 16 and subscriber compartment 20 mount to mounting frame 24 in a manner similar to how electronics enclosure 12 is mounted. In other embodiments, however, service compartment 16 and subscriber compartment 20 may be permanently attached to mounting frame 24, e.g., by welding, or other bonding techniques. However, either configuration is merely exemplary and should not be taken as limiting. As shown in FIG. 4, mounting frame 24 may be constructed to provide extra vertical mounting space to accommodate electronics enclosures of different heights.

Figure 5:
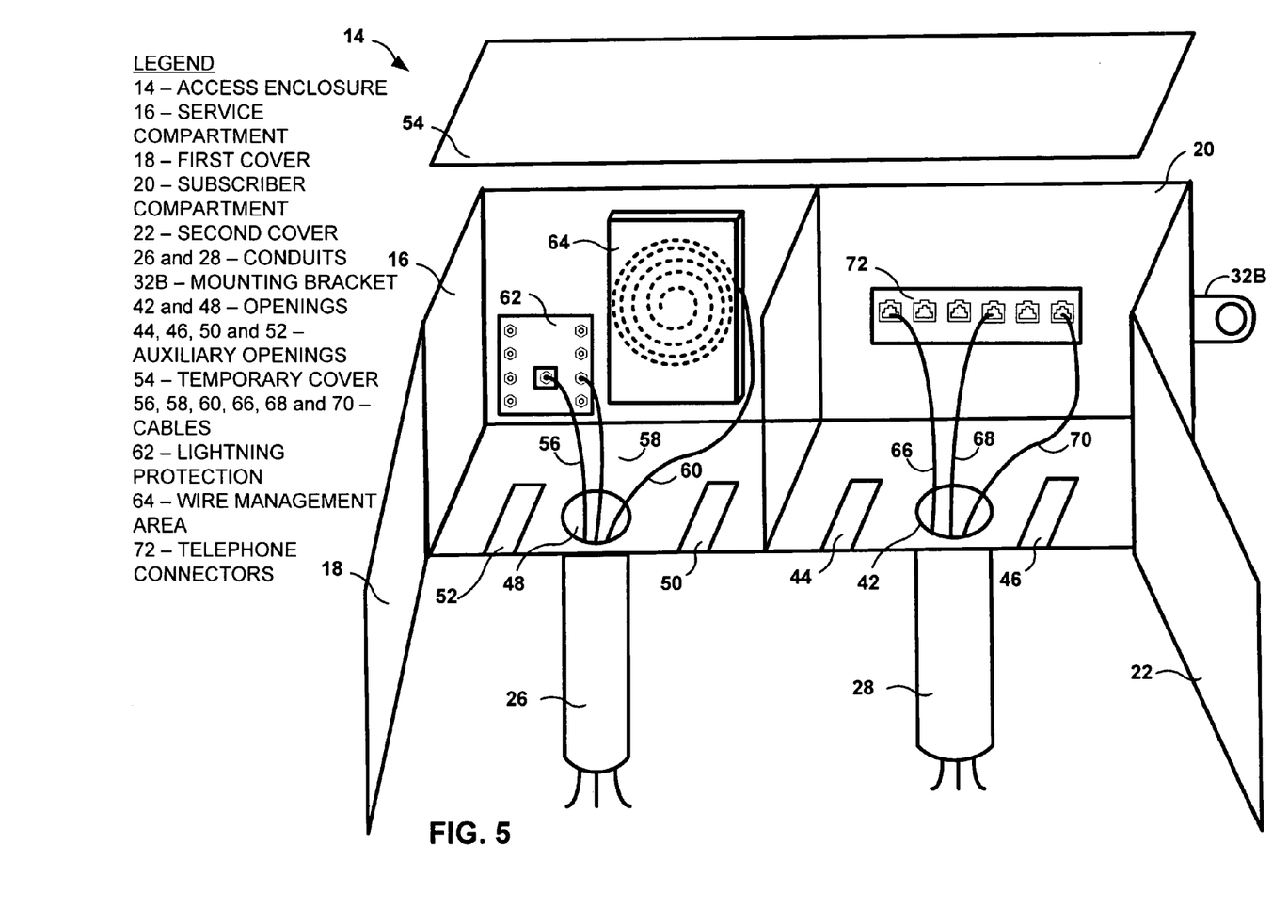
FIG. 5 is an exploded perspective view of the active NID of FIG. 4 illustrating a temporary cover, a service compartment, a subscriber compartment, network terminals and subscriber terminals

FIG. 5 is an exploded view of the active NID 10 of FIG. 4 illustrating a temporary cover 54, a service compartment 16, a subscriber compartment 20, network terminals and subscriber terminals. The network and subscriber terminals inside service compartment 16 and subscriber compartment 20 vary depending on the subscriber and the services that the subscriber receives. For example, service compartment 16 may include power inputs, safety ground, and the main input signal while subscriber compartment 20 may include binding posts for telephone connectors, Ethernet connections, and/or cable television connections.

For ease of illustration, only lightning protection 62 and a cable management area 64 are shown in service compartment 16 and only telephone connectors 72 are shown in subscriber compartment 20. However, lightning protection, cable management and other components can also be provided in subscriber compartment 20. Cables 56, 58, 60 enter service compartment 16 through opening 48. Cables 56, 58 connect to lightning protection 62, while cable 60 is stored in wire management area 64. Cable 60 may be a network signal carrier that transmits a main input signal. In the case of a PON, for example, cable 60 may be an optical fiber. The optical fiber may be stored in cable management area 64 to reduce the risk of damage to the fiber until electronics enclosure 12 is installed and the optical fiber is connected to the circuit card in the electronics enclosure.

Cables 66, 68, 70 enter subscriber compartment 20 through opening 42 and connect to connectors 72, which may include telephone connectors for telephone service, Ethernet connectors for data service, and coaxial cable connectors for video service. Cables 66, 68, 70 then are routed into the subscriber premises via conduit 28.

Covers 18, 22 provide separate doors to allow a technician and subscriber to independently access service compartment 16 and subscriber compartment 20, respectively. Cover 18 prevents the subscriber or other unauthorized individuals from tampering with network terminals, and can prevent the subscriber from being exposed to high voltage or other dangerous conditions. Cover 18 may include a lock to prohibit access by such subscribers. In contrast, cover 20 allows the subscriber to access connections such as telephone lines, video lines and data lines so that network terminals can be disconnected from all wiring inside the premises of the subscriber. In this way, the subscriber can test an outside line, e.g. a phone line, by plugging in a modular phone, so that problems can be diagnosed with the network wiring or with wiring inside the premises.

Figure 6A:
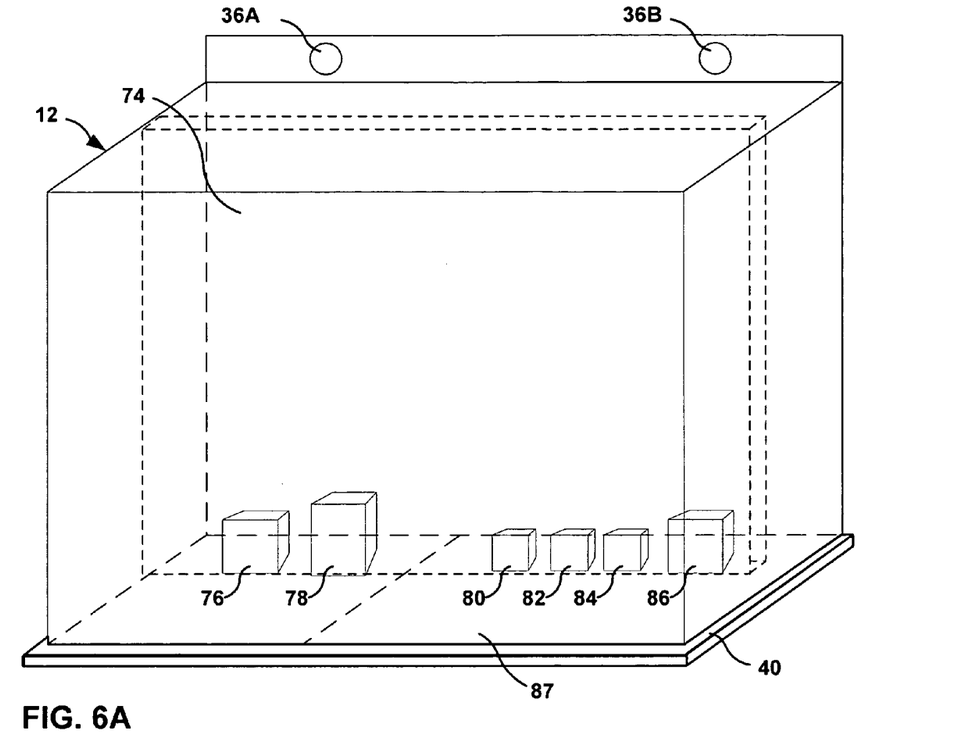
FIG. 6A is a perspective view of an electronics enclosure that includes a circuit card, network terminals, and subscriber terminals.

FIG. 6A is a diagram of an electronics enclosure 12 that includes a circuit card 74, network terminals, and subscriber terminals. Electronics enclosure 12 mounts to the mounting frame 24 by inserting a fastener through holes 36A, 36B. Flange 40 may provide a seal with access enclosure 14 to provide protection from adverse environmental conditions such as debris, moisture, animals, and other adverse effects. Circuit card 74 includes appropriate electronic circuitry to convert information received from an integrated network signal carrier into services suitable for use by subscriber devices within the subscriber premises. In turn, the circuitry also converts information received from subscriber devices into data for transmission over the integrated network, e.g., via an optical fiber.

Circuit card 74 includes network terminals on a side of the circuit card that is accessible only via service compartment 16. Subscriber terminals on an opposite side of circuit card 74 are accessible via subscriber compartment 20. In the example of FIG. 6A, the network terminals may include a power input 76 to power circuit card 74 and an optical fiber terminal 78 carrying integrated network data. The subscriber terminals may include one or more POTS or Ethernet connections 80, 82, 84, e.g., for telephone and data services, and a coaxial cable input 56 for video services.

As described herein, electronics enclosure 20 may be a five-sided shell, i.e., a rectangular prism with a single open end at a sixth side. Circuit card 74 slides into electronics enclosure 20 through the open sixth side and may be clamped in place. A face plate 87 may be installed on the sixth side, which is then exposed to service compartment 16 and subscriber compartment 20. Face plate 87 includes openings for network terminals 76, 78 and subscriber terminals 80, 82, 84, 86. In some embodiments, electronics enclosure 12 may not have a face plate. Instead, a circuit card carrying the electronic circuitry may be exposed at the sixth, bottom side of electronics enclosure. In this case, the circuit card may carry edge connectors or other terminals that are either exposed by electronics enclosure 12 or protrude outward from the interior of electronics enclosure for communication with service compartment 16 and subscriber compartment 18.

Electronics enclosure 12 shields circuit card 74 from EMI and also suppresses emission of EMI from the circuit card. To that end, electronics enclosure 12 may be constructed from a metallic material for shielding, or lined with such a material. Electronics enclosure 12 is designed to enclose circuit card 74 according to particular requirements of a vendor. Accordingly, electronics enclosure 12 can be customized to accommodate the size of circuit card 74, which may vary due to varying complexity and to accommodate different shielding requirements of different vendors. For example, some vendors may configure electronics enclosure 12 for different types of home configuration options, such as RF return, field upgradeable video, and in-home copper wiring adapters, e.g., HPNA (Home Phone Networking Alliance) and VDSL (Very High Speed Digital Subscriber Line). Such configuration options may be facilitated by the modular design of electronics enclosure 12.

Electronics enclosure 12 may be fabricated to have a common width and thickness, but to have different heights, which can be accommodated by mounting frame 24. Hence, the size of NID 10 and mounting frame 24 presents less of a constraint on the design of circuit card 74, and permits particular vendors to customize the electronics carried by electronics enclosure 12. In the example of a vendor who requires inclusion of a lifeline battery and battery charger, increased volume requirements may require circuit card 74 and electronics enclosure 12 to have an increased height relative to an electronics enclosure without such components. Typically, a vendor would be required to install an access enclosure that is large enough to fit the extra hardware.

The ability to accommodate differently sized electronic enclosures 12 can provide flexibility to vendors. Thus, some vendors may opt for smaller, less expensive enclosures, while other vendors may opt for larger, more expensive enclosures. This advantage permits ready customization such that vendors may apply to any optional features that subscribers may need such as primary lightning protection, extra Ethernet hardware, radio frequency (RF) return, cable television splitters, and cable television filters. Additionally, by designing electronics enclosure 12 to enclose circuit card 74, the invention may allow vendors to reduce the size of the circuit card and possibly reduce costs.

Figure 6B:
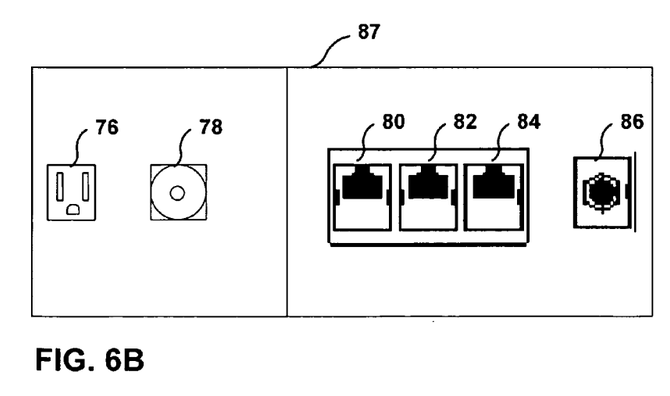
FIG. 6B is a front view of a bottom surface of the electronics enclosure of FIG. 6A illustrating a face plate that includes openings for access to network terminals and subscriber terminals.

FIG. 6B is a diagram of a bottom surface of the electronics enclosure 12 of FIG. 6A illustrating face plate 87, which includes openings for access to network terminals and subscriber terminals. Hence, face plate 87 substantially covers the sixth side of electronics enclosure 12, but exposes one or more network terminals and subscriber terminals to leave the sixth side at least partially open to communication with access enclosure 14. Again, face plate 87 forms the sixth side of electronics enclosure 12, and may function as a sliding or hinged component to allow circuit card 74 to be inserted into the electronics enclosure. Prior to installation of electronics enclosure 12 on mounting frame 24, face plate 87 also provides protection from moisture, debris, animal ingress, and other adverse effects which may damage circuit card 74.

When a technician installs electronics enclosure 20, faceplate 87 is aligned to cover the opening created by removing temporary cover 54. Cable 60 can then be connected to network terminal 78, and power can be connected to network terminal 76 on face plate 87. Similarly, cables 66, 68, 70 can be connected to respective subscriber terminals 80, 82, 84, 86 on face plate 87.

Although mounting frame 24 is depicted herein as being vertically oriented to accommodate mounting of electronics enclosure 12 on top of access enclosure 14, other embodiments may provide a lateral, rather than vertical, orientation. Hence, electronics enclosure 12 may be stacked vertically or side-by-side with access enclosure 14. Hence, in some embodiments, electronics enclosure 12 may be mounted beside the access enclosure 14, rather than on top of the access enclosure. In a lateral arrangement, electronics enclosure 12 would open to the side for access via access enclosure 14. In this case, service compartment 16 and subscriber compartment may be mounted one on top of the other, rather than side-by-side, and mounting frame 24 may be designed to provide additional lateral space to accommodate differently sized electronics enclosures.

Various embodiments of the invention have been described. These and other embodiments are within the scope of the following claims.

The invention claimed is:

1. An active network interface device comprising:
   an access enclosure comprising an access enclosure housing forming a service compartment, a subscriber compartment, and an opening to the service compartment and the subscriber compartment; and
   an electronics enclosure comprising an electronics enclosure housing, a network terminal mounted within the electronics enclosure housing, a subscriber terminal mounted within the electronics enclosure housing, and active electronic circuitry mounted within the electronics enclosure housing to convert information received at the network terminal for delivery to a subscriber device via the subscriber terminal,
   wherein the electronics enclosure housing is mounted to the opening in the access enclosure housing such that the network terminal is accessible via the service compartment and the subscriber terminal is accessible via the subscriber compartment.

2. The device of claim 1, wherein the opening includes a first opening to the service compartment and a second opening to the subscriber compartment.

3. The device of claim 1, wherein the opening is formed in a top side of the access enclosure housing, and the electronics enclosure housing is mounted above the access enclosure housing.

4. The device of claim 3, wherein the electronics enclosure includes a faceplate in a bottom side of the electronics enclosure housing, and the faceplate in the electronics enclosure mates substantially with the opening in the top side of the access enclosure housing.

5. The device of claim 1, wherein the service compartment and the subscriber compartment are positioned side-by-side.

6. The device of claim 5, further comprising a first door for access to the service compartment and a second door for access to the subscriber compartment.

7. The device of claim 1, further comprising a mounting frame to receive the access enclosure housing and the electronics enclosure housing, the mounting frame being mountable to a surface of a subscriber premises.

8. The device of claim 7, wherein the opening is formed in a top side of the access enclosure housing, and the electronics enclosure housing is mounted above the access enclosure.

9. The device of claim 8, wherein the mounting frame defines a mounting height sufficient to accommodate different heights of the electronics enclosure.

10. The device of claim 1, wherein the electronics enclosure housing is shaped substantially as a rectangular prism and is substantially closed on five sides and at least partially open on a sixth, bottom surface to permit access to the network terminal and the subscriber terminal via the opening in the access enclosure housing.

11. The device of claim 1, wherein the electronics enclosure housing includes a flange that extends over a perimeter of a top surface of the access enclosure housing proximate the opening.

12. The device of claim 1, wherein the subscriber terminal includes at least one of a telephone terminal, a video terminal and a data terminal.

13. The device of claim 1, wherein the network terminal protrudes from the electronics enclosure housing into the service compartment, and the subscriber terminal protrudes from the electronics enclosure housing into the subscriber compartment.

14. The device of claim 1, wherein the network terminal includes an optical fiber terminal.

15. The device of claim 14, wherein the electronic circuitry includes circuitry to convert information received from the optical fiber terminal to telephone, video and data services for transmission to the subscriber device via the subscriber terminal.

16. The device of claim 1, wherein the service compartment includes an opening to permit ingress of a network signal carrier for connection to the network terminal.

17. The device of claim 16, wherein the network signal carrier includes an optical fiber, and the network terminal includes an optical fiber terminal.

18. The device of claim 1, wherein the subscriber compartment includes an opening to permit egress of a subscriber signal carrier connected to the subscriber terminal.

19. The device of claim 18, wherein the subscriber signal carrier includes electrically conductive wiring and the subscriber terminal includes a pair of electrically conductive terminals.

20. The device of claim 1, wherein the electronic circuitry is configured to convert an optical signal to an electrical signal.

21. The device of claim 1, wherein the service compartment and the subscriber compartment are positioned side-by-side, the device further comprising a first door for access to the service compartment and a second door for access to the subscriber compartment, and a security latch coupled to the first door.

22. The device of claim 1, further comprising a mounting frame to receive the access enclosure housing and the electronics enclosure housing, wherein the mounting frame includes a mounting slot for selective placement of a screw to mount the mounting frame to a wall of the subscriber premises.

23. A method comprising:
mounting an access enclosure housing of an access enclosure to a surface of a subscriber premises, the access enclosure housing forming a service compartment, a subscriber compartment, and an opening to the service compartment and the subscriber compartment; and
mounting an electronics enclosure housing of an electronics enclosure to the opening in the access enclosure housing, the electronics enclosure comprising a network terminal mounted within the electronics enclosure housing, a subscriber terminal mounted within the electronics enclosure housing, and active electronic circuitry mounted within the electronics enclosure housing to convert information received at the network terminal for delivery to a subscriber device via the subscriber terminal,
wherein the electronics enclosure housing is mounted to the opening in the access enclosure housing such that the network terminal is accessible via the service compartment and the subscriber terminal is accessible via the subscriber compartment.

24. The method of claim 23, wherein the opening includes a first opening to the service compartment and a second opening to the subscriber compartment.

25. The method of claim 23, wherein the opening is formed in a top side of the access enclosure housing, and the electronics enclosure housing is mounted above the access enclosure housing.

26. The method of claim 25, wherein the electronics enclosure includes a faceplate in a bottom side of the electronics enclosure housing, and the faceplate in the electronics enclosure mates substantially with the opening in the top side of the access enclosure housing.

27. The method of claim 23, wherein the service compartment and the subscriber compartment are positioned side-by-side.

28. The method of claim 27, wherein the access enclosure includes a first door for access to the service compartment and a second door for access to the subscriber compartment.

29. The method of claim 23, wherein mounting the access enclosure includes mounting a mounting frame to the surface of the subscriber premises, and mounting the access enclosure housing to the mounting frame.

30. The method of claim 29, wherein the opening is formed in a top side of the access enclosure housing, and mounting the electronics enclosure housing includes mounting the electronics enclosure housing above the access enclosure housing.

31. The method of claim 30, wherein the mounting frame defines a mounting height sufficient to accommodate different heights of the electronics enclosure.

32. The method of claim 23, wherein the electronics enclosure housing is shaped substantially as a rectangular prism and is substantially closed on five sides and at least partially open on a sixth, bottom surface to permit access to the network terminal and the subscriber terminal via the opening in the access enclosure housing.

33. The method of claim 23, wherein the electronics enclosure housing includes a flange, and mounting the electronics enclosure housing includes mounting the electronics enclosure housing such that the flange extends over a perimeter of a top surface of the access enclosure housing proximate the opening.

34. The method of claim 23, wherein the subscriber terminal includes at least one of a telephone terminal, a video terminal and a data terminal.

35. The method of claim 23, wherein the network terminal protrudes from the electronics enclosure housing into the service compartment, and the subscriber terminal protrudes from the electronics enclosure housing into the subscriber compartment.

36. The method of claim 23, wherein the network terminal includes an optical fiber terminal.

37. The method of claim 36, wherein the electronic circuitry includes circuitry to convert information received from the optical fiber terminal to telephone, video and data services for transmission to the subscriber device via the subscriber terminal.

38. The method of claim 23, wherein the service compartment includes an opening to permit ingress of a network signal carrier for connection to the network terminal.

39. The method of claim 38, wherein the network signal carrier includes an optical fiber, and the network terminal includes an optical fiber terminal.

40. The method of claim 23, wherein the subscriber compartment includes an opening to permit egress of a subscriber signal carrier connected to the subscriber terminal.

41. The method of claim 40, wherein the subscriber signal carrier includes electrically conductive wiring and the subscriber terminal includes a pair of electrically conductive terminals.

42. The method of claim 23, wherein the electronic circuitry is configured to convert an optical signal to an electrical signal.

43. The method of claim 23, wherein mounting the access enclosure housing includes mounting a mounting frame to the surface of the subscriber premises, and mounting the access enclosure housing to the mounting frame, wherein the mounting frame includes a mounting slot for selective placement of a screw to mount the mounting frame to a wall of the subscriber premises.

44. The method of claim 23, wherein the service compartment and the subscriber compartment are positioned side-by-side, and the access enclosure includes a first door for access to the service compartment and a second door for access to the subscriber compartment, and a security latch coupled to the first door.

45. The method of claim 23, further comprising placing a temporary cover over the opening of the access enclosure housing when the electronics enclosure is not mounted to the access enclosure for an extended period of time.

46. An access enclosure for an active network interface device, the access enclosure comprising an access enclosure housing forming:
   a service compartment including a first opening to permit ingress of a network signal carrier from an integrated services network; and
   a subscriber compartment positioned side-by-side with the service compartment and including a second opening to permit egress of a subscriber signal carrier into a subscriber premises,
   wherein the access enclosure housing includes a top surface defining one or more openings to receive an electronics enclosure such that a network terminal protruding from the electronics enclosure is accessible via the service compartment and a subscriber terminal protruding from the electronics enclosure is accessible via the subscriber compartment.

47. The access enclosure of claim 46, wherein the access enclosure housing defines a ridge adjacent the top surface to receive a flange of the electronics enclosure.

48. The access enclosure of claim 46, further comprising a first door for access to the service compartment and a second door for access to the subscriber compartment.

49. The access enclosure of claim 46, further comprising one or more mounting brackets for mounting to a mounting frame that is mountable to a surface of a subscriber premises.

50. An electronics enclosure for an active network interface device, the electronics enclosure comprising:
   a housing;
   a network terminal, mounted within the housing, for connection to a network signal carrier carrying information from an integrated services network;
   a subscriber terminal, mounted within the housing, for connection to a subscriber signal carrier to deliver information to a subscriber device within a subscriber premises; and
   active electronic circuitry, mounted within the housing, to convert the information received at the network terminal to the information for delivery to a subscriber device via the subscriber terminal,
   wherein the housing is shaped substantially as a rectangular prism and is substantially closed on five sides and at least partially open on a sixth, bottom surface to permit access to the network terminal and the subscriber terminal.

51. The electronics enclosure of claim 50, wherein the subscriber terminal includes at least one of a telephone terminal, a video terminal and a data terminal.

52. The electronics enclosure of claim 50, wherein the network terminal includes an optical fiber terminal.

53. The electronics enclosure of claim 52, wherein the electronic circuitry includes circuitry to convert information received from the optical fiber terminal to telephone, video and data services for transmission to the subscriber device via the subscriber terminal.

54. The device of claim 1,
   wherein the electronics enclosure housing is mounted externally to the access enclosure housing, and
   wherein the electronics enclosure housing is exposed to a local environment.

* * * * *